Figure 1:
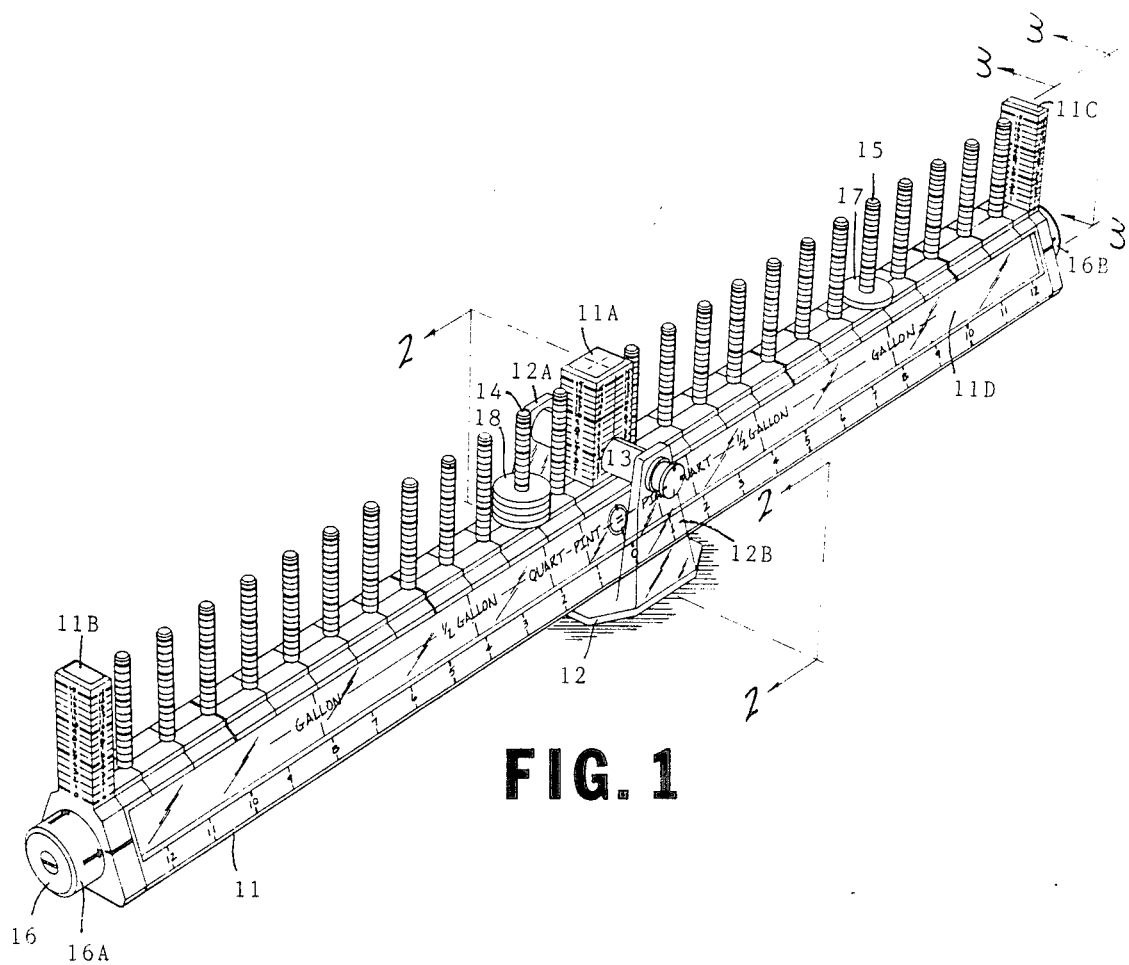

United States Patent [19]

Garland

[11] Patent Number: 4,731,022

[45] Date of Patent: Mar. 15, 1988

[54] TEACHING ARITHMETIC PRINCIPLES

[76] Inventor: Thomas A. Garland, 76 Reservoir Cir., Jamestown, R.I. 02835

[21] Appl. No.: 897,218

[22] Filed: Aug. 18, 1986

[51] Int. Cl.$^4$ .............................................. G09B 1/00
[52] U.S. Cl. ................................... 434/194; 177/190
[58] Field of Search ................................ 434/194–196, 434/259; 177/190, 193, 194; 446/297

[56] References Cited

U.S. PATENT DOCUMENTS

| | | | |
|---|---|---|---|
| 1,551,726 | 9/1925 | Birk | 177/167 |
| 2,874,515 | 2/1959 | Ford | 446/322 |
| 3,212,202 | 10/1965 | Heinichen | 434/194 |
| 3,339,291 | 9/1967 | Ruchlis | 434/302 |
| 3,486,244 | 12/1969 | Horn | 34/31 |
| 3,766,667 | 10/1973 | Glassman | 434/195 |
| 3,817,526 | 6/1974 | Bibb | 273/95 R |
| 3,928,923 | 12/1975 | Harte | 434/194 |
| 3,949,491 | 4/1976 | Harte | 434/194 |
| 4,240,213 | 12/1980 | Lutin | 434/194 |

FOREIGN PATENT DOCUMENTS

| | | | |
|---|---|---|---|
| 2129594 | 12/1972 | Fed. Rep. of Germany | 434/194 |
| 20324 | 5/1902 | United Kingdom | 177/190 |
| 650205 | 2/1951 | United Kingdom | 434/194 |
| 1246436 | 9/1971 | United Kingdom | 434/194 |
| 1407899 | 10/1975 | United Kingdom | 434/194 |

OTHER PUBLICATIONS

P. Schroeder, Equal Arm Balance, Jun. 1976, vol. 1, No. 6, Xerox Disclosure Journal.

Primary Examiner—John E. Murtagh
Assistant Examiner—Andrew Joseph Rudy
Attorney, Agent, or Firm—Charles Hieken

[57] ABSTRACT

A balance for teaching arithmetic principles has a balance arm pivotal about a central horizontal pivot axis coincident with the axis of a support rod supported in openings at the top of opposed vertical upstanding members of a support. The balance arm has a central rectangular housing and end rectangular housings at each end extending upward carrying vertical calibrations at intervals corresponding to the height of annular washers that balance the arm. A number of upstanding vertical pins similarly vertically calibrated are spaced at one-inch intervals on either side of the pivot axis at horizontal locations on the arm along respective horizontal calibration indicia of diameter corresponding substantially to the diameter of the central openings in the washers. The front face of the balance arm is transparent along its length for exposing scales on a central mandrel carrying a number of scales that may be rotated to expose a selected scale. The pivot axis is at a height corresponding to the average center of gravity of a typical vertical pile of washers, typically at about the height of 5.5 washers above the base of the vertical pins. The balance arm may have a back plate calibrated both vertically and horizontally with the central rectangular housing formed with a tapered opening for accommodating an upstanding tapered member on which the balance arm pivots.

11 Claims, 10 Drawing Figures

U.S. Patent   Mar. 15, 1988   Sheet 1 of 3   4,731,022

U.S. Patent    Mar. 15, 1988    Sheet 2 of 3    4,731,022
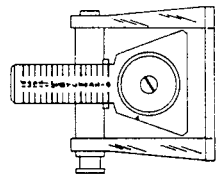
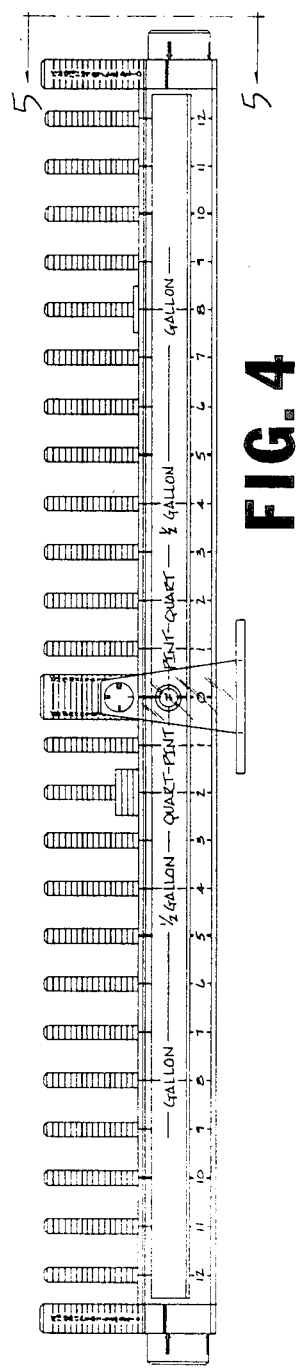
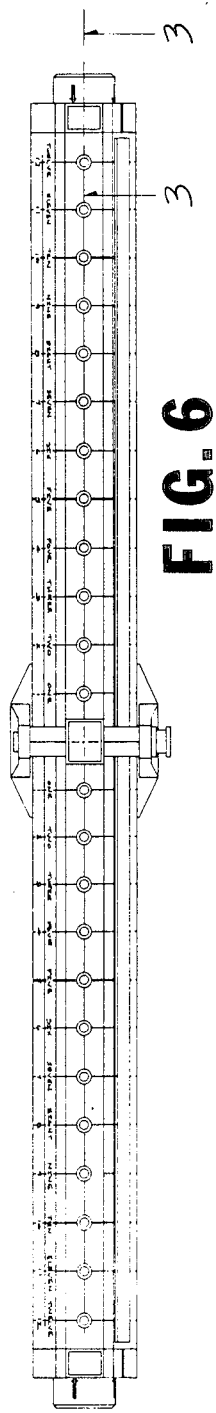
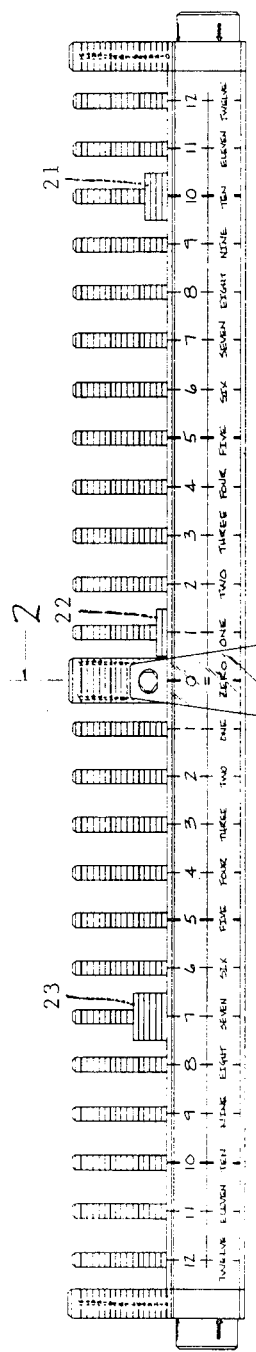

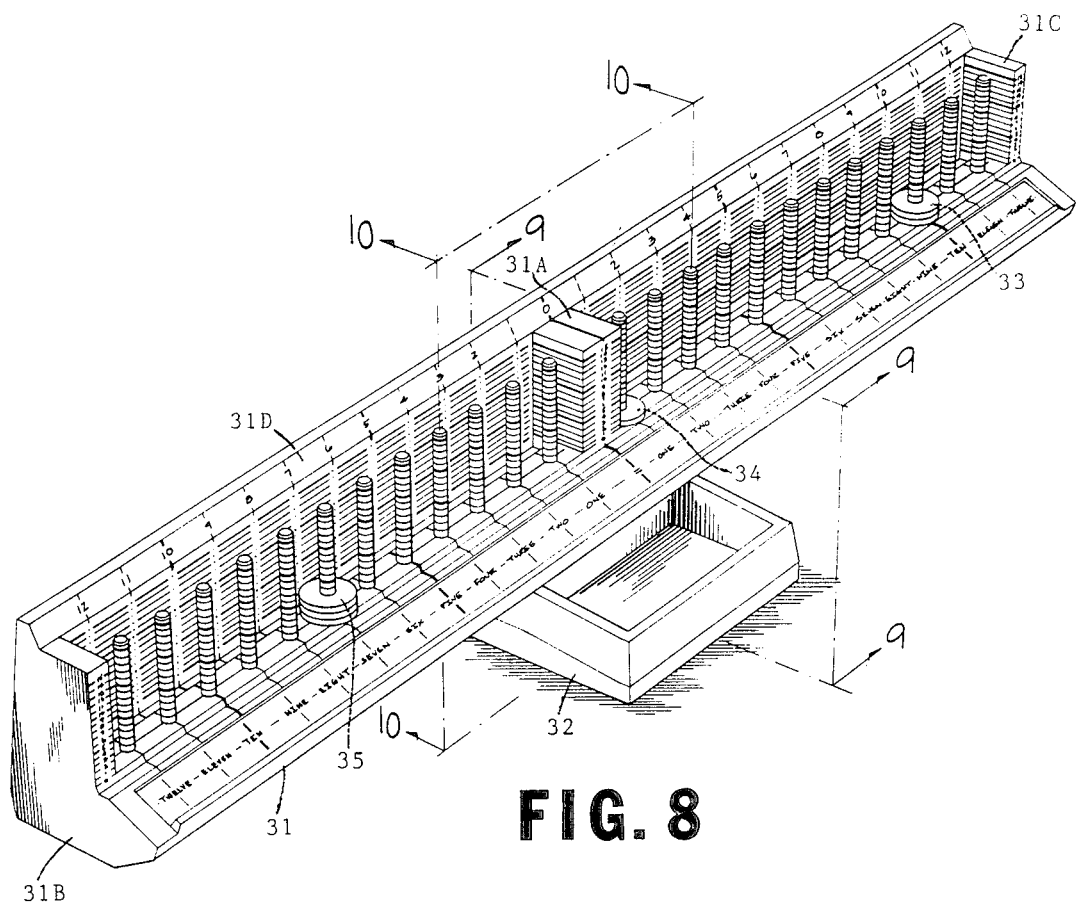
FIG. 8
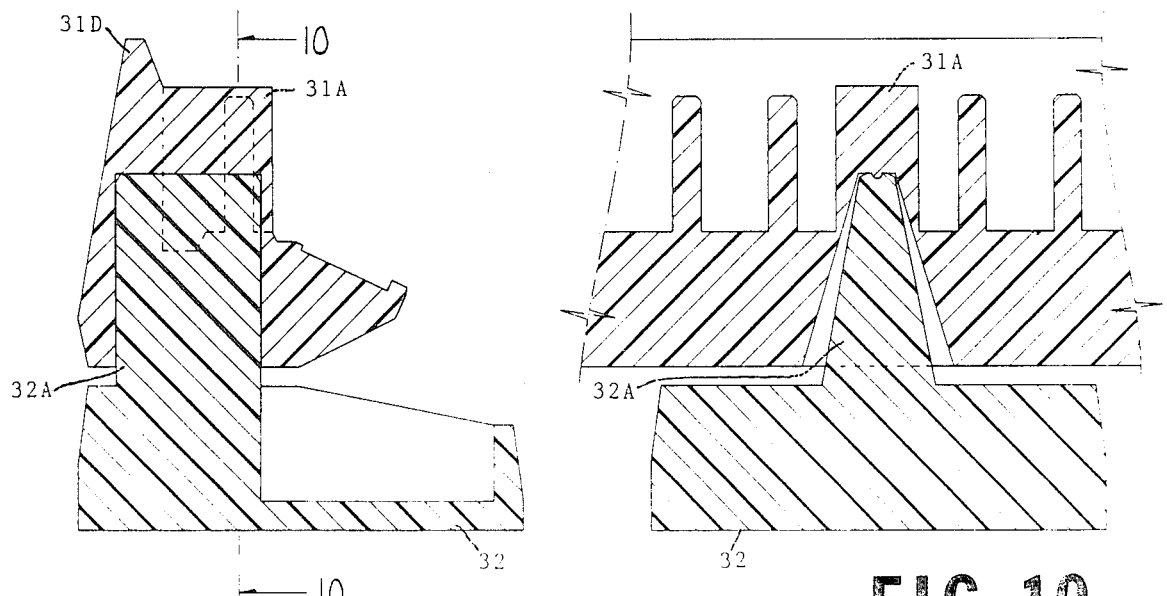
FIG. 9
FIG. 10

TEACHING ARITHMETIC PRINCIPLES

The present invention relates in general to teaching arithmetic principles and more particularly concerns novel apparatus and techniques for using a balance to teach arithmetic relations to children in an entertaining manner with structure that is relatively easy and inexpensive to fabricate and safe for use by children.

A search of the prior art uncovered U.S. Pat. Nos. 3,212,202, 3,486,244, 3,928,923, 3,949,491, 4,240,213, British Pat. Nos. 650,205, 1,407,899, German Offenlegungsschrift No. 4,129,594 and Publication—Xerox Disclosure Journal, Vol. 1, Number 6, June 1976.

It is an important object of this invention to provide improved apparatus and techniques for teaching children arithmetic principles.

According to the invention, there is support means for pivotally supporting a balance arm about a pivot point intermediate its ends. The arm is formed with a plurality of regularly spaced normally vertical rods, preferably bearing vertical calibration indicia at locations preferably bearing respective horizontal calibration indicia. A plurality of weight means formed with openings for embracing the vertical pins may be positioned on the vertical pins to balance the arm on the pivot point with the number of elements on a pin and the distance between pin and pivot point providing a moment that may be counterbalanced by weight means on the other side of the arm. Preferably the arm is formed with a transparent face for exposing an internal rotatable mandrel having a plurality of scales thereon. The support means may comprise members sandwiching the bar, preferably transparent, supporting a rod passing through an opening in an upstanding member embracing the pivot point of the arm. Alternatively, the support means may comprise a base member formed with an upstanding vertical member with the arm formed with an opening for allowing the arm to pivot about the upstanding member.

Figure 2:
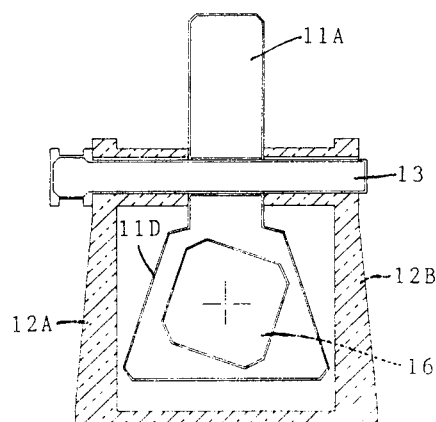
Figure 3:
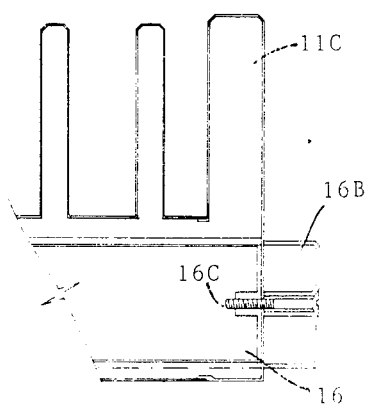

Numerous other features, objects and advantages of the invention will become apparent from the following specification when read in connection with the accompanying drawing in which:

FIG. 1 is a perspective view of an embodiment of the invention having an arm with an internal rotatable mandrel;

FIGS. 2 and 3 are sectional views through sections 2—2 and 3—3, respectively of FIG. 1;

FIGS. 4-7 are front, end, top and rear views of the embodiment of FIG. 1;

FIG. 8 is a perspective view of another embodiment of the invention having an arm with a calibrated back and an invisible support of the pivot point; and FIGS. 9 and 10 are sectional views through sections 9—9 and 10—10 of FIG. 8, respectively.

With reference now to the drawing and more particularly FIG. 1 thereof, there is shown a perspective view of an embodiment of the invention comprising an arm 11 pivotally supported on a rod 13 passing through openings in upstanding legs 12A and 12B of support member 12. Arm 11 is formed with a vertically calibrated central housing member 11A formed with an opening through which rod 13 passes and vertically calibrated end members 11B and 11C. There are twelve vertically calibrated circular pins, such as 14 and 15, between center member 11A and each of end members 11B and 11C at horizontally calibrated locations bearing correspondingly numbered indicia. The center-to-center spacing between adjacent pins and between the pivot point at 0 on the scale and the pins adjacent center member 11A, is typically 1¼ inch. Arm 11 includes a transparent window 11D extending lengthwise for exposing scales on mandrel 16 rotatable by moving knobs 16A or 16B to expose a different scale. In the example shown, a volume relationship is indicated to show that if the basic unit is a pint indicated at 1, the quart indicia lines up at 2, the ½ gallon indicia lines up at 4 and the gallon indicia lines up at 8.

The invention also includes a number of annular washers, such as 17 and 18. Each of these washers is preferably of the same weight and height as the others with the height corresponding to the height of the intervals between markings on the vertically calibrated pegs, central and end members. A typical safe size for washers is 1¼" in diameter by 3/32" thick. The result of this arrangement is that the product of washers and intervals to the pivot point on one side is equal to the product of washers and intervals on the other side to balance arm 11 about the pivot point at 0. Thus, in the example shown, balance occurs with one washer 17 at the gallon indicium at 8 to the right of the pivot point with four washers 18 at the quart indicium 2, thus teaching the child that there are four quarts in a gallon.

Referring to FIG. 2, there is shown a view through section 2—2 of FIG. 1 illustrating a preferred cross section of mandrel 16. Mandrel 16 may be of square cross section as shown with the corners flattened as shown so that the exposed face is parallel to transparent window 11D. Mandrel 16 may have any number of faces.

Referring to FIG. 3, there is shown a partial sectional view through section 3—3 of the end of the arm illustrating how knob 16B may be secured into mandrel 16 by a central screw 16C.

Referring to FIG. 4, there is shown a front view of the invention. Referring to FIG. 5, there is shown an end view of the invention. Referring to FIG. 6, there is shown a top view of the invention with washers 17 and 18 removed. Referring to FIG. 7, there is shown a rear view of the invention exposing an opaque side, but showing balance with six washers on each side; four 21 at 10, and two 22 at 1 on the right, for a total moment of 40+2 to balance six washers 23 at 7 on the left.

Referring to FIG. 8, there is shown a perspective view of another embodiment of the inventin having an arm 31 pivotally mounted upon a support 32. Member 31 is formed with vertically calibrated central member 31A, end members 31B and 31C and back member 31D. The bottom of arm 31 may be calibrated horizontally as shown. The top of back 31D may also be calibrated horizontally as shown. In FIG. 8 three washers on each side balance arm 31. Two washers 33 at 10 and one 34 at 1 on the right balance three washers 35 at 7 on the left. Referring to FIG. 9, there is shown a sectional view through section 9—9 of FIG. 8 showing central member 31A formed with an opening accommodating upstanding member 32A. Referring to FIG. 10, there is shown a sectional view through section 10—10 of FIG. 8 showing upstanding member 32A tapered at an angle slightly less than the tapered opening in central member 31A to allow arm 31 to rock about member 32A.

The invention has a number of advantages. The embodiment of FIGS. 1-7, with rotatable central mandrel 16 upon whose faces various scales and equivalences of weight and measure may be shown and positioned so that one side shows through the clear face 12D of arm 12, makes learning arithmetic principles fun. Mandrels could be made available with any number of scales and languages and with any number of faces. The balance may be achieved through a multifaceted pin 13, which may be positioned to achieve various degrees of balance accuracy. The balance support 12 is preferably of clear plastic material to avoid obscuring visibility of the scales. Permanent vertical axis numbering and identification is available at the pins and the three major rectangular posts 11A, 11B and 11C. The latter three rectangular posts provide more surface area for markings than is available on the pins. The pins may be labeled as space and clarity permit.

The alternate embodiment shown in FIGS. 8-10 facilitates presenting various scales by virtue of its recessed tray, which may hold paper or plastic scale strips. Furthermore, this embodiment of the invention is still less expensive and easier to manufacture than the embodiment of FIGS. 1-7. There may be only two (2) molded parts if produced in plastic. The support 32 may be formed with a tray for storing the washers. Moreover, visualizing the two-dimentional backboard face 31D as a matrix or line grid, it is possible to label each intersection, or to simply label two axes and visually move those reference axes vertically and horizontally to determine number values. It is possible to label backboard face 31D with vertical number sequences, such as 0-15, adjacent to each pin as space and clarity allow. The rear side of member 31D may be labeled with equivalences and arithmetical facts which, since not immediately visible to the operator, may be used as help if the operator is unable to determine an answer from token manipulation. Essentially, this hidden face may function as the answer portion of a folded page of mathematical problems.

A common feature of both embodiments includes numbered/labeled number lines in two planes/axes. The normal horizontal number line is expanded to a two-dimentional representation or grid not unlike a child's traditional multiplication table, as best seen on back 31D in FIG. 8. The vertical pins function as locators for washers and allow successful use by younger children.

Another feature is that both axes and larger numbers are increments of smaller units. There is shown increments of ones and fives, for example. Ones, twos, threes, fives and tens may be visually represented effectively by the use of segmented color bars. The horizontal axis to 12 might show a blue line broken into lengths of two, a yellow line into lengths of three, a red line into lengths of five and one or more colors used for other lengths. Particularly with the large surface area available for describing and representing both axes as shown in FIG. 8, an essentially limitless combination of visual/graphic aids may be presented.

In the specific examples the horizontal scales run to 12, and the vertical scales run to 15, thereby allowing 12×12 to be calculated as 14 tens and 4 ones. While vertical pins are protected from impact by larger columns or backboard, it may be advantageous to make the pins removable or replaceable if broken. This replaceability could be achieved by having pins push fit into sockets or by having a threaded socket, for example. It is preferable that pins be semipermanent because indiscriminate removal will reduce the balance accuracy. Fine tuning of balance, if necessary to compensate for manufacturing tolerances, may be achieved by repositioning a small set screw horizontally on the bottom face of the balance beam.

Washer size is preferably large enough to prevent swallowing by a young child. Overall washer-like configuration is advantageous, both from the standpoint of cost and ease of manipulation. The display face angles are preferably chosen to allow the operator to have important scales displayed on planes nearly normal to his line of sight, as shown in FIG. 9, for example.

The combined center of gravity of washers stacked vertically will vary. It is preferable to locate the balance arm pivot at an approximate average height of the vertical center of gravity of washers, typically at about 5 on the vertical axis. The vertical position of the center of gravity affects the balance accuracy only when the beam is not in the balanced/horizontal position. Insofar as the pivot typically rests on either knife edge when not balanced, the effective pivot point is advantageously moved, in the same direction as, and to compensate for, the horizontal movement of the vertical center of gravity of the tokens. Inaccuracies introduced by vertically stacking tokens are reduced to a negligible level by having the pivot point above the zero base level of the beam and by selecting an appropriate pivot face width, both determined from an estimate of average token center of gravity height. The vertical orientation is advantageous in allowing a number of substantial height to stand visually as a single unit on its exact position on a horizontal number line.

There has been described novel apparatus and techniques for economically and advantageously facilitating learning arithmetic principles with structure that is reliable, safe and relatively easy and inexpensive to fabricate. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for teaching arithmetic principles comprising,
    balance arm means for receiving balancing weights and having ends,
    support means for pivotally supporting said balance arm means at a predetermined horizontal pivot axis,
    said balance arm means including a plurality of upstanding pin means at spaced locations between said ends for receiving balancing weights and each having a top and bottom,
    said balance arm means having horizontal and vertical calibration indicia for identifying the location and height respectively of weights relative to said pivot axis,
    there being a plurality of said vertical calibration indicia at a respective location with adjacent ones separated by a predetermined interval.

2. Apparatus for teaching arithmetic principles in accordance with claim 1 wherein said balance arm means is formed with a central housing over said predetermined pivot axis and first and second end housings at the ends of said balance arm means, each of said housings bearing said vertical calibration indicia.

3. Apparatus for teaching arithmetic principles in accordance with claim 2 wherein said vertical pins are regularly spaced at respective horizontal indicia along said balance arm means.

4. Apparatus for teaching arithmetic principles in accordance with claim 3 wherein said vertical pins bear said vertical calibration indicia.

5. Apparatus for teaching arithmetic principles in accordance with claim 4 and further comprising,
   a plurality of weight means each formed with an opening for snugly surrounding a pin means and characterized by height,
   the height of each of said weight means corresponding substantially to said predetermined interval between adjacent vertical indicia.

6. Apparatus for teaching arithmetic principles in accordance with claim 1 wherein said balance arm means includes a transparent face along its front,
   and central mandrel means inside said balance arm means extending along its length rotatable about the balance arm means axis and having a plurality of scales thereon only one of which is visible through said transparent face,
   and means for selectively positioning said mandrel means to expose a selected one of said scales through said transparent face.

7. Apparatus for teaching arithmetic principles in accordance with claim 1 wherein said balance arm means is formed with a back plate behind said pins,
   said back plate having both said vertical and horizontal calibration indicia.

8. Apparatus for teaching arithmetic principles in accordance with claim 1 wherein said support means comprises,
   a base having first and second upstanding legs,
   and a rod coaxial with said horizontal pivot axis passing through said balance arm means and supported by said upstanding legs.

9. Apparatus for teaching arithmetic principles in accordance with claim 8 wherein the front one of said upstanding legs is transparent.

10. Apparatus for teaching arithmetic principles in accordance with claim 1 wherein said support means comprises,
    a base formed with an upstanding tapered ridge narrower at the top than the bottom,
    said balance arm means being formed with a tapered recess accommodating said tapered ridge,
    said tapered recess being wider at the bottom than the top and embracing a greater angle than the angle embraced by said tapered ridge.

11. Apparatus for teaching arithmetic principles in accordance with claim 1 wherein said horizontal pivot axis is between horizontal planes including the top and bottom of said pin means.

* * * * *